United States Patent [19]

Garland et al.

[11] Patent Number: 4,855,949

[45] Date of Patent: Aug. 8, 1989

[54] NOCHANGE ATTRIBUTE MODE

[76] Inventors: Anthony C. Garland, 603 N. Sunset Dr., Camano Island, Wash. 98292; Randal L. Jones, 22307 65th Ave. W., Mountlake Terrace, Wash. 98043

[21] Appl. No.: 859,820

[22] Filed: May 5, 1986

[51] Int. Cl.[4] .......... G06F 3/14; G09G 1/00

[52] U.S. Cl. .......... 364/900; 340/735; 340/748; 340/750

[58] Field of Search .......... 364/200, 900; 340/735, 340/748, 750, 715, 723, 703, 709, 731

[56] References Cited

U.S. PATENT DOCUMENTS

| | | | |
|---|---|---|---|
| 4,057,849 | 11/1977 | Ying et al. | 364/200 |
| 4,241,340 | 12/1980 | Raney, Jr. | 340/744 |
| 4,328,557 | 5/1982 | Gastinel | 340/750 |
| 4,384,285 | 5/1983 | Long et al. | 340/703 |
| 4,386,410 | 5/1983 | Pandya et al. | 364/521 |
| 4,404,554 | 9/1983 | Tweedy, Jr. et al. | 340/750 |
| 4,422,070 | 12/1983 | Couper et al. | 340/709 |
| 4,435,703 | 3/1984 | Hunt et al. | 340/723 |
| 4,462,028 | 7/1984 | Ryan et al. | 340/723 |
| 4,504,828 | 3/1985 | Couper et al. | 340/735 |
| 4,563,677 | 1/1986 | Seiler | 340/735 |
| 4,581,611 | 4/1986 | Yang et al. | 340/723 |
| 4,599,612 | 7/1986 | Kaji et al. | 340/723 |
| 4,613,856 | 9/1986 | Olin et al. | 340/703 |
| 4,624,591 | 11/1986 | Barnes et al. | 364/900 |
| 4,646,077 | 2/1987 | Culley | 340/748 |
| 4,648,047 | 3/1987 | Barkland et al. | 364/523 |
| 4,755,814 | 7/1988 | Olsen | 340/799 |

*Primary Examiner*—Gareth D. Shaw
*Assistant Examiner*—Adolfo Ruiz

[57] ABSTRACT

An improved display controller provides commands for changing a display. The controller includes a component for determining whether or not the command provided thereby includes an attribute changing command therein. If a NOCHANGE mode has been set, and the controller component determines that an implicit attribute changing command is included in the display command, the attribute changing command is inhibited. If a direct, explicit, attribute changing command is detected, the attribute change is performed. If the NOCHANGE mode has not been set, all attribute changing commands are executed, whether implicitly or explicitly provided.

19 Claims, 2 Drawing Sheets

NOCHANGE ATTRIBUTE MODE

TECHNICAL FIELD

This invention relates to display control devices, and more specifically to devices for changing contents of a display independently from changing attributes thereof.

BACKGROUND ART

In a known display apparatus, various display elements (e.g., alphabetic and numeric characters) may be displayed with any of a number of attributes. Thus, the characters may be highlighted, may be underlined, may be displayed in reverse video, may be concealed, or may be presented in blinking (i.e., on-and-off) form.

Where the commands for providing particular attributes to the characters are provided by a host computer, similar commands are also provided to negate the above described attributes. Thus, an underline may be removed from a character, a character may be caused to stop blinking, or may be presented in normal video, etc., upon provision to the display of a negating command for any of the above described attributes.

Similarly, line displays, as well as displays of lines of characters, may be provided with particular attributes. Particularly, lines of displayed characters may be displayed in double-width, double-size, or normal size. Finally, a screen attribute may be provided in which the foreground characters are displayed in one shade or color and in which the background is displayed in another shade or color. The shading or coloration of the characters and/or display background may be varied, and a particular arrangement may be selected in default situations.

In some display systems it is known to provide display commands in which the displayed characters are changed. Thus, in a touch control screen, for example, wherein a touch control panel is mounted on a display screen, various characters are displayed in particular regions of the screen providing the various touch controls, the displays associated with each touch control region may require variation for different applications. One or more of the regions may be changed while others may remain constant from application to application.

Further, various interactive or warning messages may be displayed on the screen. Such messages may be changed from moment to moment.

In an existing system a host computer conveys commands to a controller in the display for changing the characters displayed thereon. However, in such a system it is known that, together with a change in a displayed character the attributes thereof are changed, unless a specific command is provided either to retain the current attribute or to change the same. Accordingly, in such a system a change of display contents alone is made difficult since, in addition to providing the new characters for display the host computer must also provide to the display controller commands for setting the character attributes. Thus, updating characters within a particular field of the display requires communication of additional commands to identify provision of the same attributes that previously were present. Similarly, when a display is scrolled on a screen, each new line coming onto the screen must be accompanied by a command providing therefor the attributes, even though the attributes may not change from line to line.

There is thus a need to improve known display devices and to eliminate the necessity for provision of repetitive attribute commands. More specifically, there is a need for method or apparatus for permitting changes in contents of a display while maintaining constant the attributes of the display.

DISCLOSURE OF INVENTION

It is accordingly an object of the present invention to overcome existing difficulties in display systems and to permit changes in display contents while avoiding a requirement for providing repetitious commands to the display for maintaining constant display attributes.

It is a more specific object of the invention to provide method and apparatus for changing contents of a display without, at the same time, requiring changes in attributes of the display, thus reducing the number of commands which must be provided to a display controller with provision of a command to change the display contents.

In accordance with these and other objects of the invention, there is provided a method and apparatus for effecting changes in elements of a display without at the same time changing attributes of the display. Preferably, there is provided in the present invention an arrangement for selectively setting a NOCHANGE mode of operation for the display controller.

In accordance with the invention any display change command to be executed by the control means is examined to determine if an attribute change, whether direct or indirect, is required thereby. Further, the system is interrogated to determine whether the NOCHANGE mode has been set for operation. If it is determined that the display change command includes only an indirect requirement for changing display attributes, and if it is determined that the NOCHANGE mode has been set, the indirect changes of display attributes is inhibited.

However, the invention is further operable for bypassing the inhibiting of indirectly required attribute changes when it is determined that the NOCHANGE mode is reset (i.e., is not set).

Similarly, in accordance with a preferred aspect of the invention, when it is determined that a direct command is provided for changing display attributes, such changes are implemented without the necessity of inquiring into the set or reset status of the NOCHANGE mode.

In accordance with a preferred embodiment of the invention, direct commands for changes in display attributes include commands to highlight, underline, blink, conceal or display in reverse video the various display elements. Other direct commands for implementing change in display attributes include commands for displaying lines of characters in normal, double width, or double size configurations, and to provide changes or reversals in foreground and background shading of the characters and display background. Commands which indirectly require changes include commands for displaying normal characters, for erasing characters, for erasing characters in a line, for erasing characters in the display, for erasing a region of the display, for outlining a region and for scrolling a display. Each of the latter commands, which include indirect commands for turning off various character attributes or for providing default attributes, is implemented by the inventive system with or without implementation of the indirect attribute change command depending on the status of a NOCHANGE selector.

BRIEF DESCRIPTION OF THE DRAWINGS

The foregoing and other objects, features and advantages of the invention will become more readily apparent to those of ordinary skill in the art to which the invention pertains upon reference to the following detailed description of the best mode for carrying out the invention, when considered in conjunction with the accompanying drawing in which a preferred embodiment of the invention is shown by way of illustration, wherein.

BEST MODE FOR CARRYING OUT THE INVENTION

As hereinabove described, the present invention is applicable to a display system, and more particularly to a display system of the type illustrated at FIG. 1.

Figure 1:
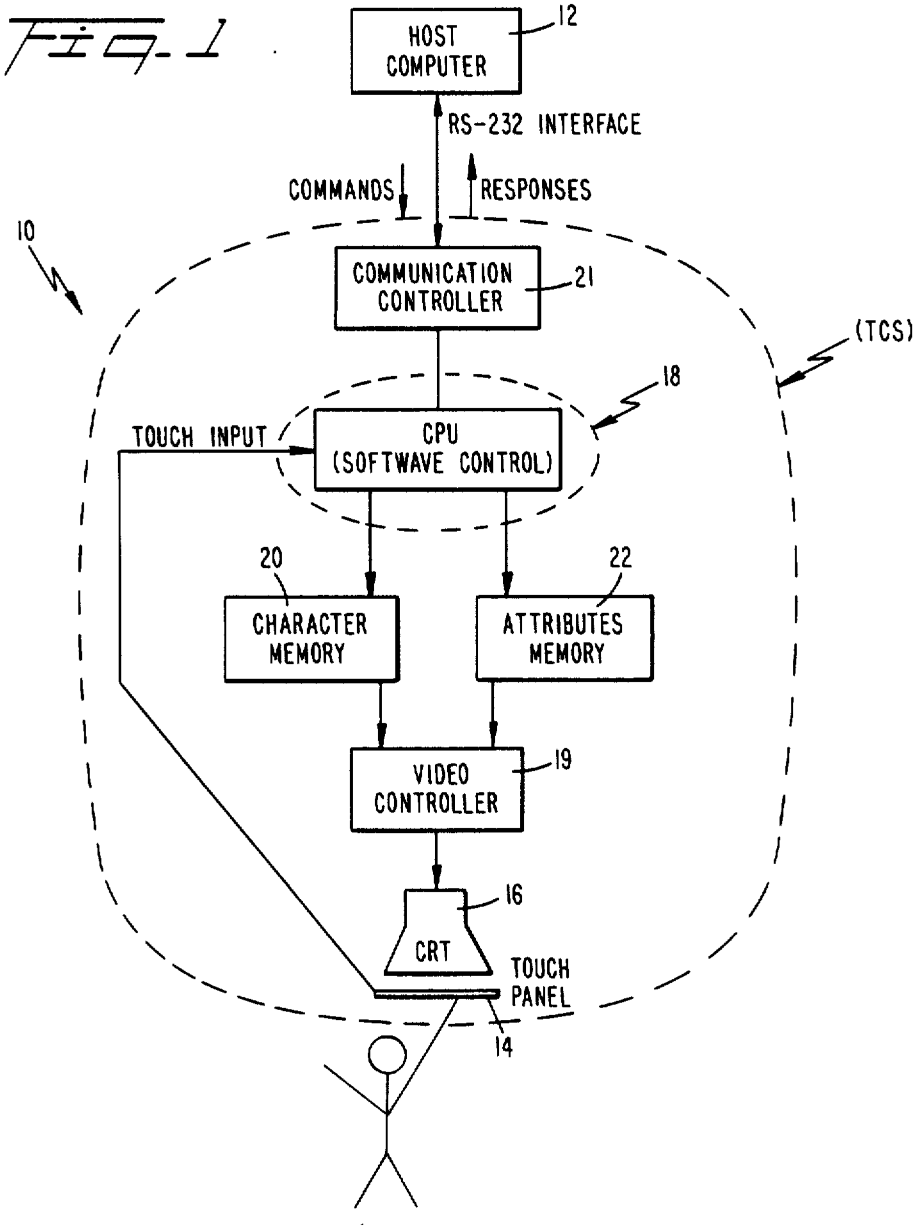
FIG. 1 illustrates in block diagram form a system incorporating the improvement of the present invention, and FIG. 2 provides a flow chart illustration of the improvement of the present invention.

Referring now to FIG. 1, there is generally shown at 10 a display system incorporating the improvement of the present invention. Preferrably, the display system is associated with a touch control screen (TCS), although any display system may benefit from the present invention. As also seen in the Figure, a host computer 12 is provided. The host computer communicates with the TCS via a communication controller 21. Controller 21 controls both the transfer of commands from the host to the TCS and the transfer of responses from the TCS to the host. Moreover, host 12 and controller 21 are connected for receiving user input from an input touch panel 14. It should be recognized, however, that although a direct user input is contemplated by touch panel 14, the input commands to the host computer may be provided from other input devices, such as keyboards, and from other systems, and particularly from other computers. At any rate, upon receiving particular input data or control data to affect an imaged display on a display 16, preferrably a CRT, the host computer 12 is programmed to generate a command which, as previously noted, may include indirect commands for changing attributes of the display. The commands are provided to a CPU display controller 18 which, in turn, modifies a character memory 20 containing the characters and, depending upon the state of a NOCHANGE mode and the type of command, may modify an attributes memory 22 containing the atributes. The video controller then fetches the contents of character memory 20 and attributes memory 22 and causes CRT 16, or other output device, to generate the display, whether by printing, by providing output signals for communication to another system, or by generating a raster scan for display on the CRT.

In accordance with the invention, a command of the program in host computer 12 includes a provision for setting or resetting the state of the NOCHANGE mode. As will be appreciated, the command may be input by a user via a keyboard, or may be input by another device in communication with the host computer. Alternatively, the command may be generated by the host computer in response to a setswitch, or the like.

When the NOCHANGE mode is set, operation of the program resident in a CPU 18 within the TCS is modified so that, for those display changing commands which also include indirect changes of display attributes, only the character memory is altered leaving the attribute memory unaffected.

Figure 2:
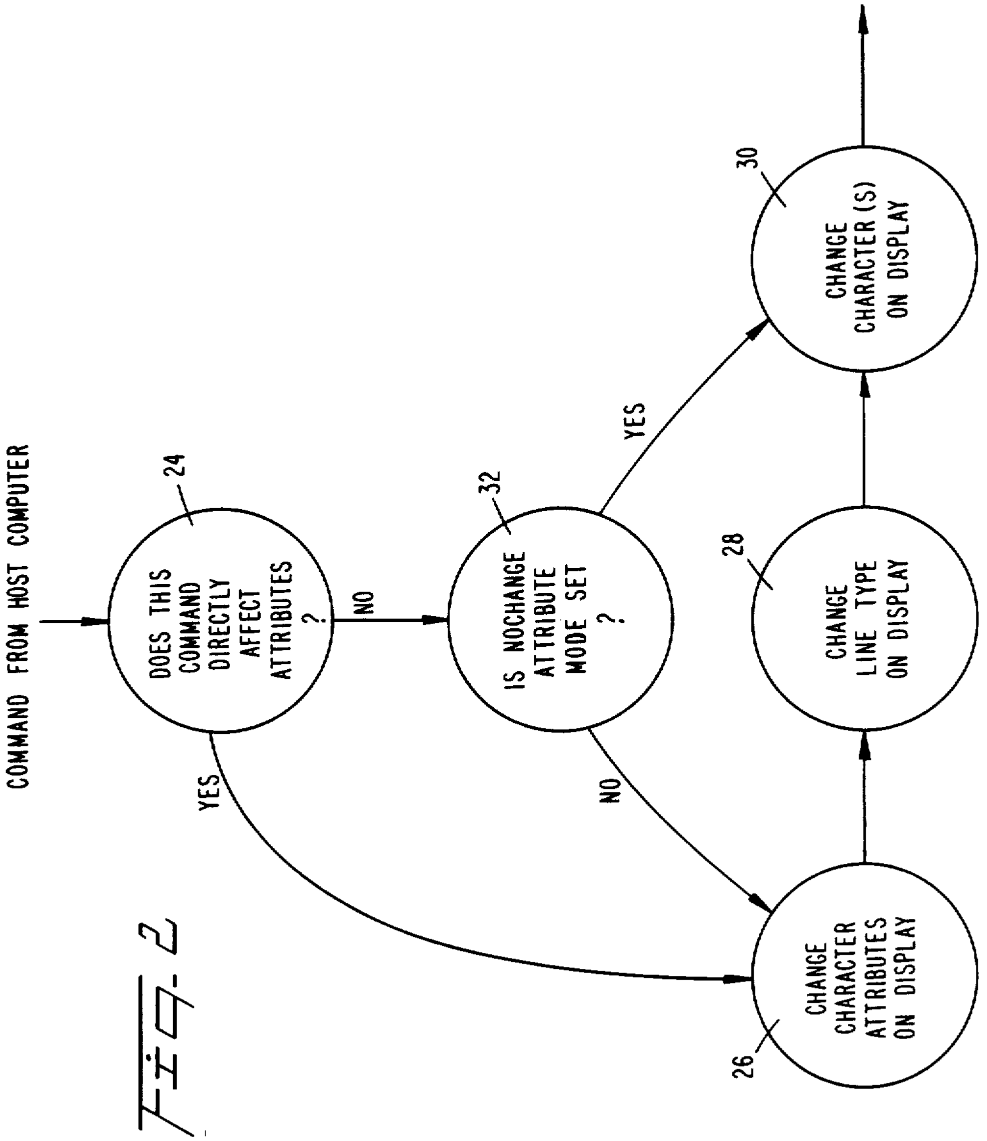

Referring specifically to FIG. 2, a portion of a flow chart describing operation of the inventive system is shown. The illustrated portion includes the improvement of the present invention.

In FIG. 2 there is shown a step 24 of a display operation to be performed by CPU 18. Therein, it is determined whether the command to be executed includes direct or indirect effects on the display attributes. If it is determined that the command includes a direct effect on display attributes, the program continues with step 26, which generates the necessary commands for changing attributes of the displayed characters. At step 28 commands for changing the line attributes are generated, to change said attributes as necessary, while at step 30 the contents of the display, specifically the characters generated for display on CRT 16, for example, are changed so that appropriate character and attribute data is generated by the CPU 18 and provided to a video controller 19.

However, if at step 24 it is determined that the command being executed by the host computer only indirectly affects the display attributes, program control passes to step 32. At step 32 it is determined whether the NOCHANGE mode has been placed in a set or a reset condition.

If the NOCHANGE mode is determined at step 32 to be in a set condition, control passes to step 30 so that the indirect attribute affecting aspect of the command is not executed and only the display characters are changed. That is, the signals provided from CPU 18 to the video controller 19 require only changes in the characters being displayed, and not in the attributes of the portions of the display occupied by the previous characters which are being replaced. However, if it is determined at step 32 that the NOCHANGE mode is in a reset state, e.g., if the host computer 12 has not set the NOCHANGE mode, program control passes to step 26. Therein the indirect attribute changing portion of the command being executed by host computer 12 is put into effect. Thus, attribute display signals are generated for characters and lines at steps 26 and 28. The characters to be displayed are changed at step 30 so that signals incorporating both the change in content and the change in attributes of the display are provided to the video controller 19. For systems not incorporating the present invention, each display change command includes steps 26, 28, and 30.

It is thus seen that when the NOCHANGE mode is set by the host computer 12 the display attributes do not revert to default values merely because of changes in the characters being displayed. Similarly, when new characters are added to the display, as in a scrolling display, the attributes previously assigned to the screen (whether by the host processor or otherwise) remain so that a programmer may control the display more easily, without requiring repeated generation of command code to control the display attribute.

Similarly, where the display system is associated with a touch control screen including a touch sensitive panel 14 placed over the CRT 16, it is expected that the system responds to contacting various regions of the touch sensitive panel by modifying the displays, such as toggling between displays of "on" and "off" for status of various parameters controlled by the touch control screen. Without the benefit of the present invention, each change, or toggle, displayed in response to activation of the touch control screen results in a change of both the characters being displayed and their attributes, so that the host processor is required to provide a number of commands, or a programmer is required to generate additional lines of code in order maintain the display attributes at a fixed status. However, with the present invention the additional modification of the display attributes are unnecessary since the system would respond to a command merely by changing the contents of the display and not the attributes thereof.

It is thus seen that the present invention provides to a display apparatus a facility for associating particular display attributes with particular regions of the display. That is, once an attribute has been set for a field or region of the screen, the attribute remains independently of the contents of the field or region. Entire regions of the display screen may thus be made to preserve the visual attributes thereof even though the character contents within the regions are changed. Features such as double-width scrolling regions may be provided on the display in which double width scrolling does not require continued host intervention.

As a result of the present invention, for example, a scroll of displayed characters may proceed between two fields. In a first field the display may be in double width while in the second field the display may be in normal width. When the NOCHANGE mode is set, change in displayed characters will not effect change in attributes and reversion to default values set by the host computer. Thus, it is unnecessary for the host computer to intervene repeatedly in displaying such a scroll and, where the display is responsive to specific code input at keyboard 14, it is unnecessary for the user to generate the code for controlling such intervention to assure the desired attributes. Accordingly, by providing a single arrangement of attributes to the screen display, any further changes in the displayed characters are achieved without simultaneously requiring repetition of the attribute arrangement commands.

As hereinabove noted, a display system may include a number of visual attributes. Clearly, when it is desired to change the attributes of the display a user merely provides a direct command to change the attribute. When such a command is generated, the flow chart of FIG. 2 illustrates the proper performance of such a command. However, when content changing commands are executed in a NOCHANGE mode condition, the visual attributes remain constant.

The following table lists commands which indirectly change the visual attributes and a comparison of the response to such commands when the NOCHANGE mode is set and when the NOCHANGE mode is reset.

| Command | NOCHANGE reset | NOCHANGE set |
|---|---|---|
| Displaying Normal Characters | Characters are replaced. | Characters are replaced. |
| | Character attributes are replace using current character attributes selected | Character attributes are unaffected. |
| Erase Character | Characters are erased. | Characters are erased. |
| | Character attributes turned off. | Character attributes are unaffected. |
| Erase in Line | Characters are erased. | Characters are erased. |
| | Character attributes turned off. | Character attributes are unaffected. |
| Erase in Display | Characters are erased. | Characters are erased. |
| | Character attributes turned off. | Character attributes are unaffected. |
| | Lines may have their line types reset to normal. | Line types unaffected. |
| Erase a Region | Characters are erased. | Characters are erased. |
| | Character attributes turned off. | Character attributes are unaffected. |
| Outline a Region | Characters are replaced. | Characters are replaced. |
| | Character attributes are replace using current character attributes selected | Character attributes are unaffected. |
| Scrolling | Line leaving the scrolling region has characters erased, attributes turned off, and line type reset to normal before it reappears as the new line at the opposite edge of the scrolling region. | Line leaving has only its characters erased. The attributes and line type are preserved unchanged when it reappears as the new line at the opposite edge of the scrolling region |

Thus, if the host provides a command requiring a change in screen, line or character attributes, the CPU 18 executes and performs precisely the identified (direct) changes. However, where all that is desired to change is the character content of the display, the present invention, by activation of the NOCHANGE mode selector, avoids the necessity for intervention and reestablishment of the display attributes.

For example, the host may provide a display "WARNING . . . HEAT RISING", having highlighted attributes, together with a further display on the screen of "Reduce fuel flow" with a non-highlighted display attribute. Subsequently, the host may provide in the first warning region a display of "DANGER . . . OVER LIMIT". Without the present invention it would be necessary to provide a direct command for highlighting the danger indication. With the present invention, however, the highlighted attribute is retained in that portion of the display merely by setting the NOCHANGE mode.

An additional example illustrates the invention still further. Where a region is outlined by the host computer with a particular box type, and where the area is highlighted, if it becomes necessary to change the box type but it is desired to maintain the highlighted outline, setting the NOCHANGE mode together with replacement of the character contents of the previous outline with the new box type may be achieved by the "outline a region" shown in the above table. If it is later desired to remove highlighting from the box, a direct command for negating highlighting may be provided in a region command. Thus, it is unnecessary to reset the NOCHANGE mode selector since a direct attribute change command is executed independently of the setting thereof.

Yet another example may be used to illustrate the invention. Let it be assumed that the host has changed all the lines on the screen to be double-size tops and bottoms, so that the screen can be filled entirely with double-sized characters. Normally, when the NOCHANGE mode selector is set, if the host erases the entire screen with an Erase in Display command, all the line types which specified double-sized top or bottom would be reset back to default values to indicate normal lines. In order to avoid this condition but still to be able to erase the contents of the display, the host could set the NOCHANGE mode, perform the erasure, and still retain the double-size attributes of the screen.

It should be noted that in accordance with the last example the host computer sets or resets the NOCHANGE mode. The mode may be set or reset in response to software commands from the host computer through the communication controller 21 to the CPU 18 of FIG. 1. Thus, the NOCHANGE mode may be conditionally set or reset, as part of a program running on the host computer, without requiring operator intervention. It should thus be recognized that the invention as a whole pertains to a system in which means is provided for determining whether a command directly or indirectly affects display attributes, for determining whether a NOCHANGE mode is or is not set, and for providing in response to these determinations modification of display contents, display attributes, or both.

The foregoing description of the preferred embodiment of the invention has been presented for purposes of illustration and description and is not intended to be exhaustive or to limit the invention to the precise forms disclosed, since many obvious modifications and variations are possible in the light of the above teaching. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended thereto, when interpreted in accordance with the full breadth to which they are fairly and legally entitled.

What is claimed is:

1. In a display control device having control means for effecting changes in elements of a display controlled thereby, the control means responsive to a set of direct commands for changing attributes of the displayed elements by causing a display means to generate a display having the changed attributes, the control means further responsive to a set of indirect commands for changing individual elements of the display by causing the display means to generate a display including the changed elements with attributes different from attributes of the elements previously displayed, the improvement comprising:

first means for determining whether a command effected by the control means to change display elements includes a direct or indirect command to change attributes of the display elements, second means for determining whether a NOCHANGE mode has been set or reset, and inhibiting means for inhibiting changes of display attributes of regions of the display including the affected elements when said first means determines that the command effected by the control means includes only an indirect command to change attributes and said second means determines that the NOCHANGE mode has been set.

2. An improved display control device as recited in claim 1 wherein said second means is operable for deactivating said inhibiting means when the NOCHANGE mode reset.

3. An improved display control device as recited in claim 1 wherein said first means is operable for causing said control means to change attributes of the display elements when a direct command for attribute change is detected thereby.

4. An improved display control device as recited in claim 1 wherein said second means is operable for causing said control means to change attributes of the display elements when an indirect command for attribute change is detected by said first means and the NOCHANGE mode is detected by said second means to be in a reset state.

5. An improved display control device as recited in claim 1 wherein said first means is operable for detecting existence of an indirect command to change display element attributes upon detecting that the control effected by the control means is any one of a set of commands including commands for : displaying characters, erasing characters, erasing characters in line, erasing a region of the display, outlining a region of the display, and scrolling the display.

6. An improved display control device as recited in claim 1 wherein said first means detects a direct command to change display element attributes upon detecting that the control effected by the control means is one of a set of commands, including commands for: changing character attributes, changing line attributes, and changing screen attributes.

7. An improved display control device as recited in claim 1 wherein said first means detects a direct command to change display element attributes upon detecting that the control effected by the control means is one of a set of commands, including commands for: highlighting characters, underlining characters, blinking characters, displaying characters in reverse video, concealing characters, negating attributes of highlighting, underlining, blinking, reversal or concealment of characters, displaying characters in normal lines, displaying double width lines, displaying double sized lines and modifying character attributes in a region of the display.

8. An improved display control device as recited in claim 1 wherein said display means comprises a display screen for said display and a touch sensitive panel attached to said display screen.

9. In a display control device having control means for effecting changes in elements of a display controlled thereby, the control means responsive to a set of direct commands for changing attributes of the displayed elements by causing a display means to generate a display having the changed attributes, the control means further responsive to a set of indirect commands for changing individual elements of the display by causing the display means to generate a display including the changed elements with attributes different from attributes of the elements previously displayed, the improvement comprising:

a method for eliminating indirect modifications of attributes of the display thus reducing the number of instructions to be given to the control means for effecting changes in display elements of the display, comprising the steps of:

determining whether a command effected by the control means to change display elements includes a direct or indirect command to change attributes of the display elements, determining whether a NOCHANGE mode has been set or reset, and inhibiting changes of display attributes of regions of the display including the affected elements when the result of the first mentioned determining step indicates that the command effected by the control means includes only an indirect command to change attributes and the results of the second mentioned determining step indicate that the NOCHANGE mode has been set.

10. An improved method as recited in claim 9 wherein said second mentioned determining step includes the step of bypassing said inhibiting step when the nochange mode has been reset.

11. An improved method as recited in claim 9 wherein said first mentioned determining step includes the step of causing said control means to change attributes of the display elements when a direct command for attribute change is detected.

12. An improved method as recited in claim 9 wherein said second mentioned determining step includes a step of causing said control means to change attributes of the display elements when an indirect command for attribute change is detected in said first mentioned determining step and the NOCHANGE mode is detected in said second mentioned determining step to be reset.

13. An improved display control device as recited in claim 9 wherein said first mentioned determining step includes a step of detecting existence of an indirect command to change display element attributes upon detecting that the control effected by the control means is any one of a set of commands including commands for: displaying normal characters, erasing characters, erasing characters in line, erasing a region of the display, outlining a region of the display, and scrolling the display.

14. An improved display control device as recited in claim 9 wherein said first mentioned determining step includes a step of detecting a direct command to change display element attributes upon detecting that the control effected by the control means is one of a set of commands, including commands for: changing character attributes, changing line attributes, and changing screen attributes.

15. In a display system for displaying a plurality of display elements, the system including means for identifying an element to be displayed at a particular location of the display and for identifying a visual attribute of the particular location, and means for inputting commands to change the element to be displayed at said particular location, the improvement comprising:

means for replacing a first element, displayed by said system at said particular location and characterized by a first visual attribute, by a second element, displayed by said system at said particular location and characterized by said first visual attribute, including:

first means for identifying said second element to be displayed at said particular location, and second means for maintaining unchanged said first visual attribute of said particular location independently of display of said first or second element therein.

16. An improved display system as recited in claim 15, wherein said second means comprises:

third means for establishing a NOCHANGE mode of operation, fourth means responsive to said third means for determining whether said third means has established said NOCHANGE mode of operation, and fifth means, operable when said fourth means determines that said third means has established said NOCHANGE mode of operation, for displaying said second element at said particular location while maintaining unchanged said first visual attribute of said particular location.

17. An improved display system as recited in claim 16, wherein:

said commands for changing an element to be displayed at said particular location include two classes of commands, a first class requiring a change of displayed element and implicitly requiring a change of attribute at said particular location, and a second class explicitly requiring a change of attribute at said particular location, said fifth means comprises: sixth means for determining whether said means for inputting commands has input a command of said first or second class, and seventh means responsive to said fourth means for ignoring implicit requirements of said first class of commands when said third means has established said NOCHANGE mode of operation.

18. An improved display system as recited in claim 16, wherein said third means includes means for establishing a global NOCHANGE mode of operation wherein attributes for all locations of said display remain unchanged, and said fifth means is operable, when said fourth means determines that said third means has established said global NOCHANGE mode of operation, for displaying said second element at each particular location while maintaining unchanged said first visual attribute of said particular location.

19. An improved display system as recited in claim 16, wherein the system includes default means for reverting a visual attribute of the particular location to a default attribute when the element to be displayed at said particular position is to be changed, and said fifth means is operable in response to said fourth means by disabling said default means of the display system.

* * * * *